United States Patent [19]

Nakano

[11] 4,301,903
[45] Nov. 24, 1981

[54] WHEEL HUB WITH A FREEWHEEL

[76] Inventor: Takazi Nakano, No. 1, 122, Hikiso Nishimachi, Sakai, Osaka Pref., Japan

[21] Appl. No.: 75,843

[22] Filed: Sep. 14, 1979

[30] Foreign Application Priority Data

Feb. 8, 1979 [JP] Japan ................................ 54-14020

[51] Int. Cl.³ ............................................ F16D 41/30
[52] U.S. Cl. ...................................... 192/64; 308/192
[58] Field of Search ................ 308/23.5, 179.5, 192; 192/6 R, 45.1, 46, 71, 64

[56] References Cited

U.S. PATENT DOCUMENTS 2,226,247 12/1940 Lesage ................................ 192/64
3,010,553 11/1961 DerPlas ............................... 192/64
3,554,340 6/1971 Shimano et al. ..................... 192/64
4,102,215 7/1978 Nagano et al. ....................... 192/64

Primary Examiner—C. J. Husar
Assistant Examiner—Conrad Berman
Attorney, Agent, or Firm—Wenderoth, Lind & Ponack

[57] ABSTRACT

A wheel hub with a freewheel which has a hub shaft passing through a hub proper adapted to rotate smoothly on steel balls and a gear ring equipped with a sprocket wheel fitted in said hub proper by a ratchet mechanism. The steel balls are held adjustably by both a shoulder of the hub proper and a screw cap, and a lock nut is screwed on the hub proper at the outside of the screw cap so as to prevent loosening of the screw cap.

5 Claims, 4 Drawing Figures

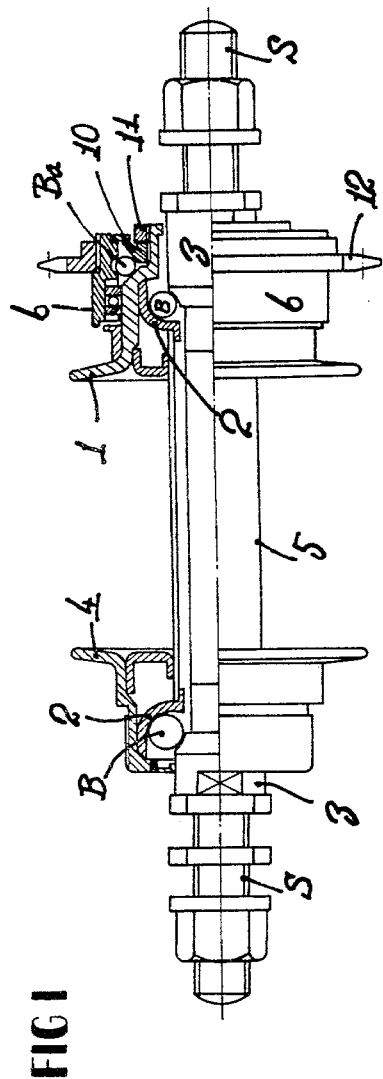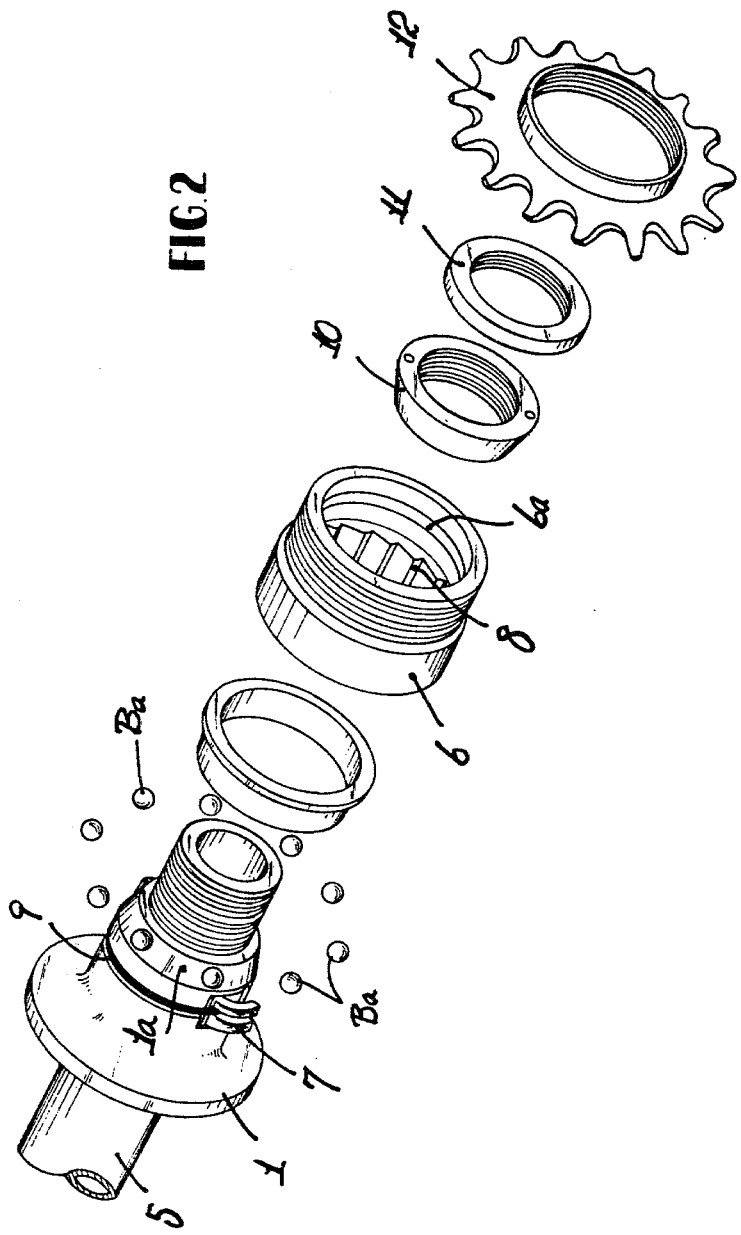

WHEEL HUB WITH A FREEWHEEL

BACKGROUND AND SUMMARY OF THE INVENTION

This invention relates to a wheel hub with a freewheel which is suitable for bicycles, motorcycles, minibikes and the like.

Conventional freewheels for bicycles, motorcycles, etc. have a construction in which an inner rim of a freewheel is threaded to the outer periphery of a hub proper and a ratchet mechanism is provided between the freewheel and the inner rim constituted by ratchet pawls on the outer periphery of the inner rim and ratchet teeth on the inner peripheral surface of the freewheel. According to this construction, the inner rim, the ratchet mechanism and the freewheel are placed one upon another concentrically. Thus, with this arrangement it has been very difficult to manufacture small freewheels having a small number of teeth.

The present invention has been made to eliminate the above-mentioned disadvantages of the conventional freewheel. The present invention has for its object to make it possible to construct a wheel hub with a freewheel having a small outside diameter at a lower cost by providing a ratchet mechanism laterally of the steel balls.

BRIEF DESCRIPTION OF THE DRAWING

The nature and advantages of the present invention will be understood more clearly from the following description of the present invention made with reference to an embodiment shown in the drawings, in which:

FIG. 1 is a front view of a wheel hub according to the present invention, with the upper half shown in cross section;

FIG. 2 is an exploded perspective view of the wheel hub according to the present invention;

DETAILED DESCRIPTION OF THE INVENTION

Figure 3:
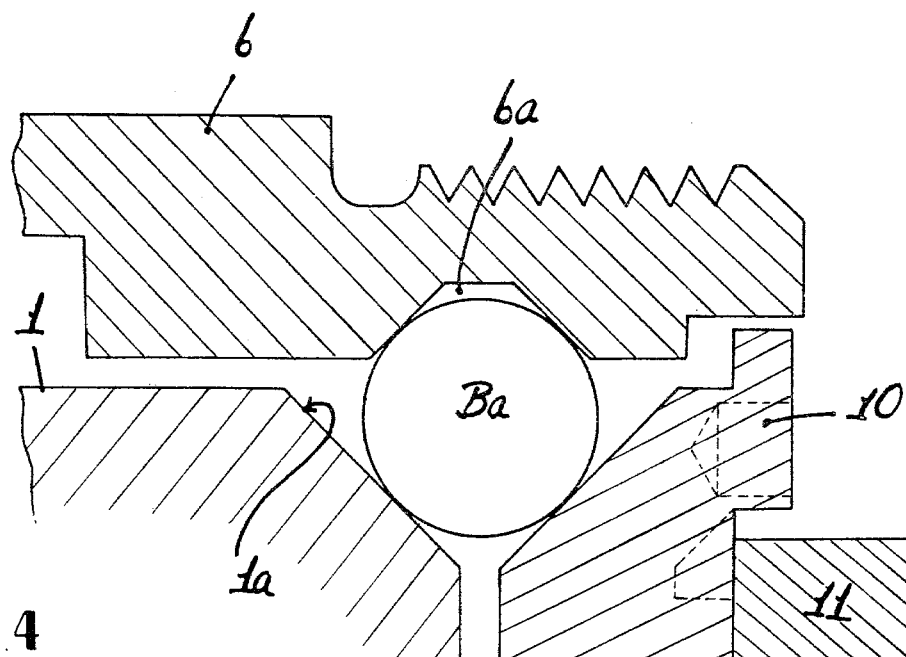
FIG. 3 is a cross section of the main part, on an enlarged scale, of the wheel hub according to the present invention.
Figure 4:
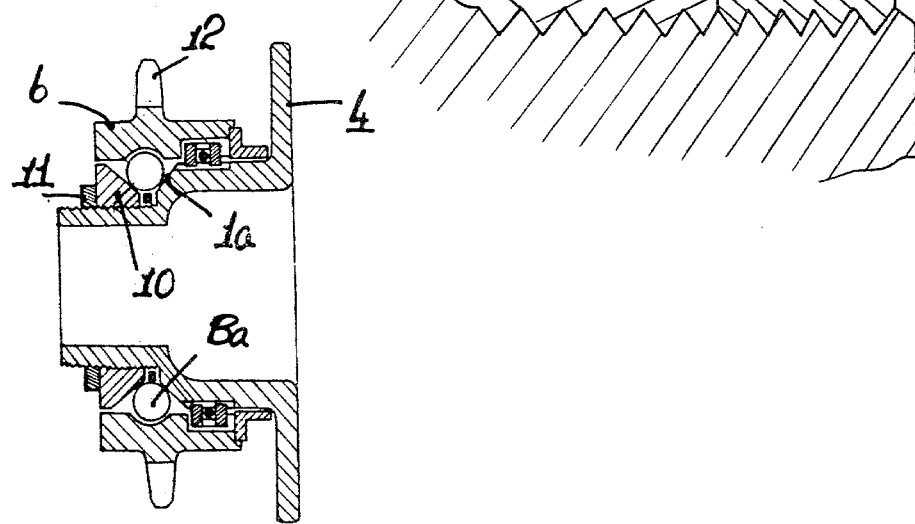
FIG. 4 is a cross section of another embodiment of the present invention.

In the drawing, numeral 1 denotes a wheel hub proper with a flange. A hub shaft S is passed through the wheel hub proper 1, and steel balls B are supported by a bowl 2 provided in the wheel hub proper and a ball retainer 3 which is screwed onto the hub shaft S. Thus, the wheel hub 1 is rotatably supported, by means of steel balls B, on the hub shaft S. The wheel hub proper 1 is opposed to another wheel hub proper 4, to the outer periphery of which is fixed in some cases a drum for a band brake or the like. These two wheel hubs 1 and 4 are connected to each other by a hub pipe 5 through which the hub shaft S passes.

Fixed to the outer periphery of the wheel hub 1 is a gear ring 6 having on the inner peripheral surface a groove 6a into which steel balls Ba partly extend. Provided between the gear ring 6 and the wheel hub 1 are pawls 7 and the ratchet teeth 8 which constitute a ratchet mechanism. Ratchet teeth 8 can be on the outer periphery of the wheel hub proper and the pawls 7 on the inner peripheral surface of the gear ring or, as shown in the drawing, the ratchet teeth 8 can be provided on the inner peripheral surface of the gear ring and the pawls 7 swingably mounted on the outer periphery of the wheel hub proper by a circular shaped spring 9.

At the position opposite the groove 6a of the gear ring 6, there is formed a shoulder 1a having a taper shape on the wheel hub proper. The smaller diameter outer end of the wheel hub proper is threaded on the outer periphery. A cap 10 is threaded onto the hub and is so designed that one side thereof presses and supports steel balls Ba against the wheel hub proper. Many steel balls Ba, which are fitted in the groove 6a in the inner peripheral surface of the gear ring 6, are supported by both the screw cap 10 and the shoulder 1a of the wheel hub proper 1. In this case, the gear ring 6 is rotatable only in one direction in relation to the wheel hub proper due to the ratchet mechanism.

Outwardly of the screw cap 10 threaded on the wheel hub proper is threaded a lock nut 11. Thus, a double nut arrangement is provided to prevent loosening of the screw cap 10 and to make the screwing of the screw cap 10 optimum, whereby the gear ring is rotated smoothly at all times.

Threads are provided on the outer periphery of the gear ring 6 and a sprocket wheel 12 having the required number of teeth is screwed onto the ring 6 or the sprocket wheel is formed integrally with the gear ring 6.

In the above embodiment, no spacer ring is used between the shoulder of the hub and the screw cap, but a spacer ring can be used therebetween, where necessary.

According to the present invention, when steel balls to be fitted in the gear ring are retained by both the wheel hub proper and the screw cap, a gap between the steel balls and the wheel hub proper and the gap between the screw cap and the steel balls can be adjusted properly and easily by the extent of screwing of the screw cap onto the hub proper. Therefore, the freewheel is allowed to rotate smoothly and can be assembled simply. Moreover, application of a lock nut to the outside of the screw cap prevents loosening of the screw cap.

What is claimed is:

1. A wheel hub with a freewheel, comprising:
   a hub shaft having a hub portion on one end, a single tapered bearing surface thereon, and a threaded portion on the opposite end from said hub portion;
   a single annular array of steel balls against said bearing surface;
   a gear ring around said hub shaft and having a groove in the internal peripheral surface thereof in which said balls are engaged;
   a sprocket wheel on said gear ring;
   a ratchet means between said hub shaft and said gear ring and positioned along said hub shaft between said hub portion and said bearing surface;
   a screw cap threaded on said threaded portion of said hub shaft and having a further tapered bearing surface supporting said array of steel balls; and
   a lock nut on the threaded portion of said hub shaft against said screw cap to prevent loosening of said screw cap.

2. A wheel hub as claimed in claim 1 in which said sprocket wheel is removably mounted on the outer peripheral surface of said gear ring.

3. A wheel hub as claimed in claim 1 in which said sprocket wheel is integral with the outer periphery of said gear ring.

4. A wheel hub as claimed in claim 1 in which said ratchet mechanism has ratchet teeth on the inner peripheral surface of said gear ring and pawls on said hub shaft.

5. A wheel hub as claimed in claim 1 in which said ratchet mechanism has ratchet teeth on said hub shaft and pawls on the inner peripheral surface of said gear ring.

* * * * *